Sept. 22, 1953     G. R. PURIFOY ET AL     2,653,292
VOLTAGE AND CONTROL RESPONSIVE DYNAMIC BRAKING CONTROL SYSTEM
Filed April 15, 1950     3 Sheets-Sheet 3
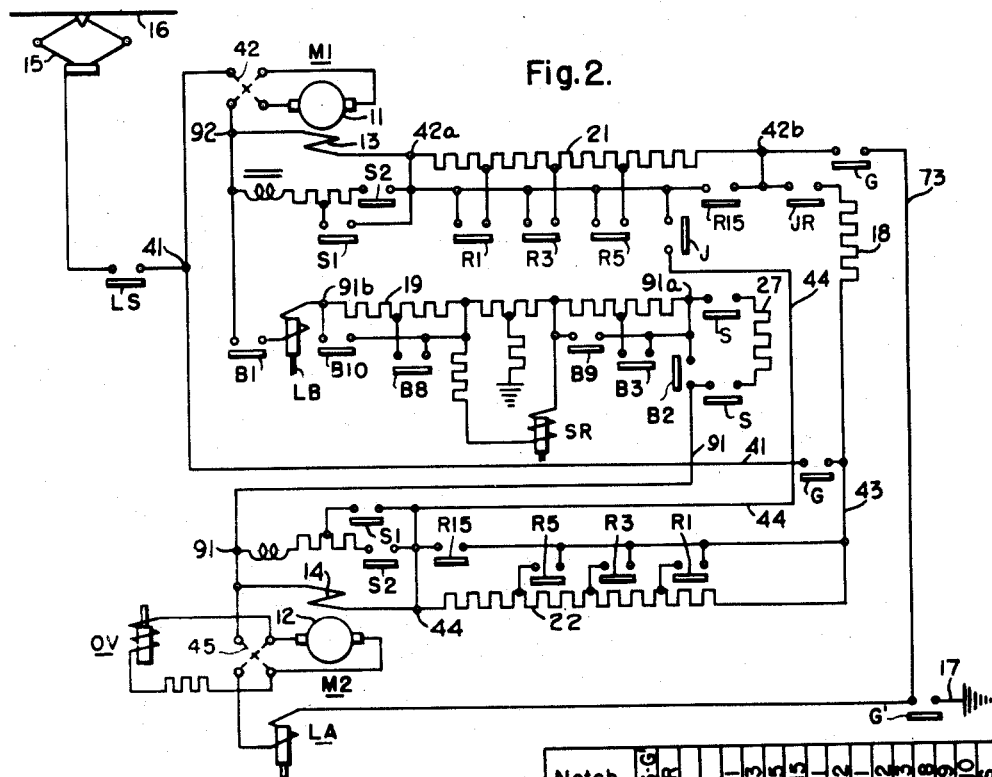
Fig. 2.
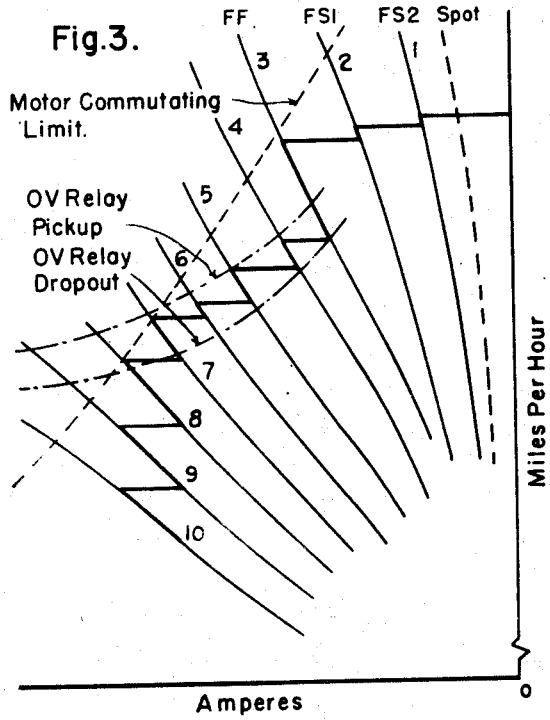
Fig. 3.
Fig. 4.
INVENTORS
George R. Purifoy and
Charles F. Jenkins.
BY 
ATTORNEY Patented Sept. 22, 1953

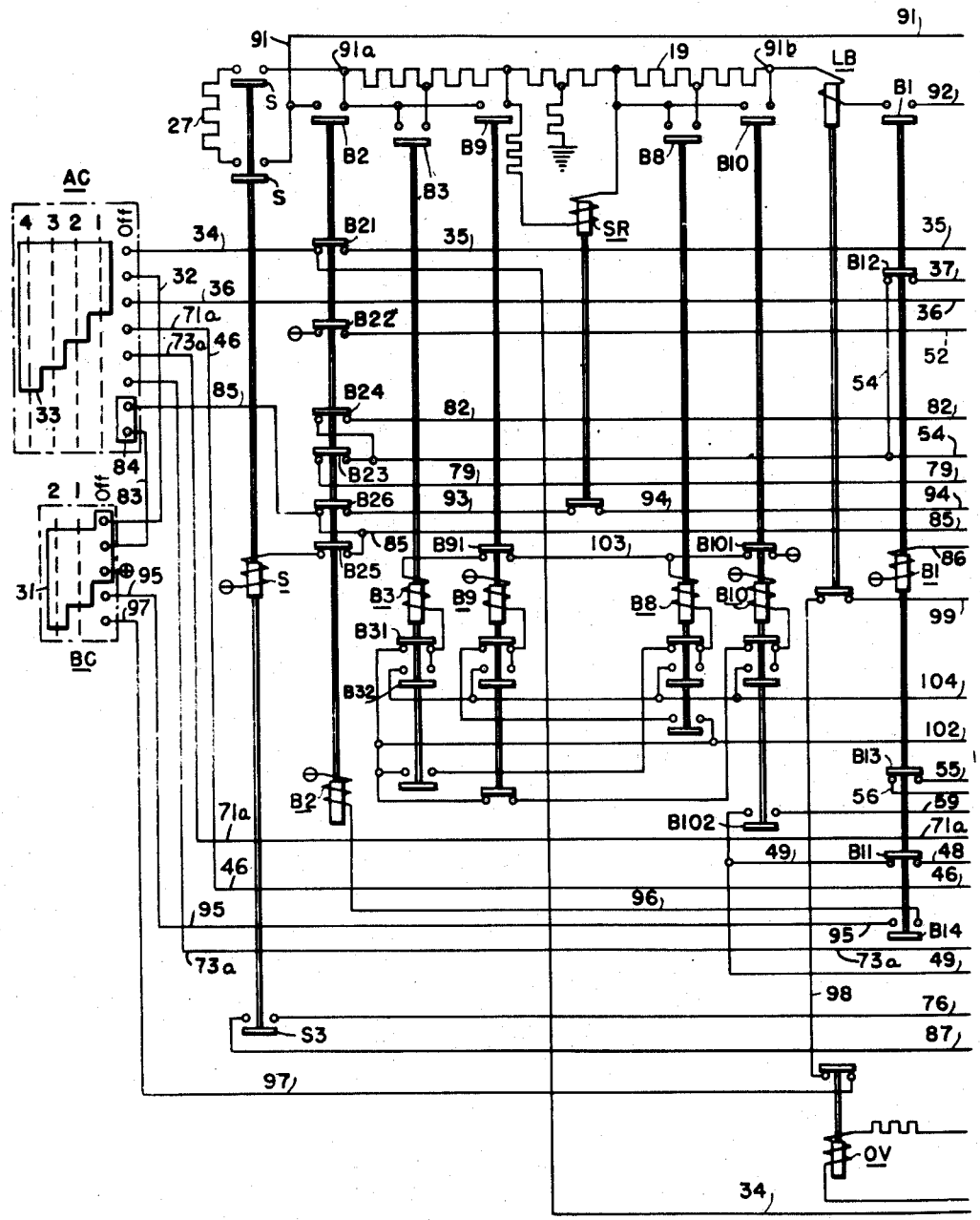

2,653,292

UNITED STATES PATENT OFFICE 2,653,292

VOLTAGE AND CURRENT RESPONSIVE DYNAMIC BRAKING CONTROL SYSTEM

George R. Purifoy, Pittsburgh, and Charles F. Jenkins, Laughlintown, Pa., assignors to Westinghouse Electric Corporation, East Pittsburgh, Pa., a corporation of Pennsylvania Application April 15, 1950, Serial No. 156,058

13 Claims. (Cl. 318—381)

Our invention relates, generally, to control systems and, more particularly, to systems for controlling the dynamic braking of the propelling motors of electric vehicles.

If the dynamic braking current is not kept within certain values when operating at high vehicle speeds there is danger of the motors flashing, as the volts per motor and the volts between bars of the coils undergoing commutations will be higher than the commutating limits of the motors established during their design.

An object of our invention is to permit the operation of electrically propelled vehicles at high speeds without exceeding the commutating limits of the motors during dynamic braking.

Another object of our invention is to provide for the application of dynamic braking at all vehicle speeds.

A further object of our invention is to provide voltage responsive and current responsive relays which cooperate in controlling the dynamic braking current in the motors of a vehicle.

Still another object of our invention is to provide a dynamic braking control system which may be utilized on multiple-unit cars connected in trains, without requiring extra train-line wires.

A more general object of our invention is to provide a control system which shall be simple and efficient in operation and which may be economically manufactured and installed.

Other objects of our invention will be explained fully hereinafter or will be apparent to those skilled in the art.

According to one embodiment of our invention, the automatic progression of the dynamic braking control apparatus for an electric vehicle above a predetermined speed is under the control of a voltage relay responding to the armature volts of one motor. In case the voltage exceeds the permissible armature voltage the progression is checked until the voltage is within range, thereby protecting the motors from excessive voltage and giving a low rate of braking until a current limit relay takes control. On brake applications below the aforesaid predetermined speed the progression of the control apparatus is under the control of the current limit relay.

For a better understanding of the nature and objects of our invention, reference may be had to the following detailed description, taken in conjunction with the accompanying drawings, in which:

Figures 1A and 1B, when combined, constitute a diagrammatic view of a control system embodying the principal features of the invention;

Fig. 2 is a schematic diagram of the main motor and control circuits;

Fig. 3 is a dynamic braking notching curve for a motor controlled in accordance with the invention, and Fig. 4 is a chart showing the sequence of operation of part of the apparatus illustrated in Figs. 1 and 2.

Figure 1B:
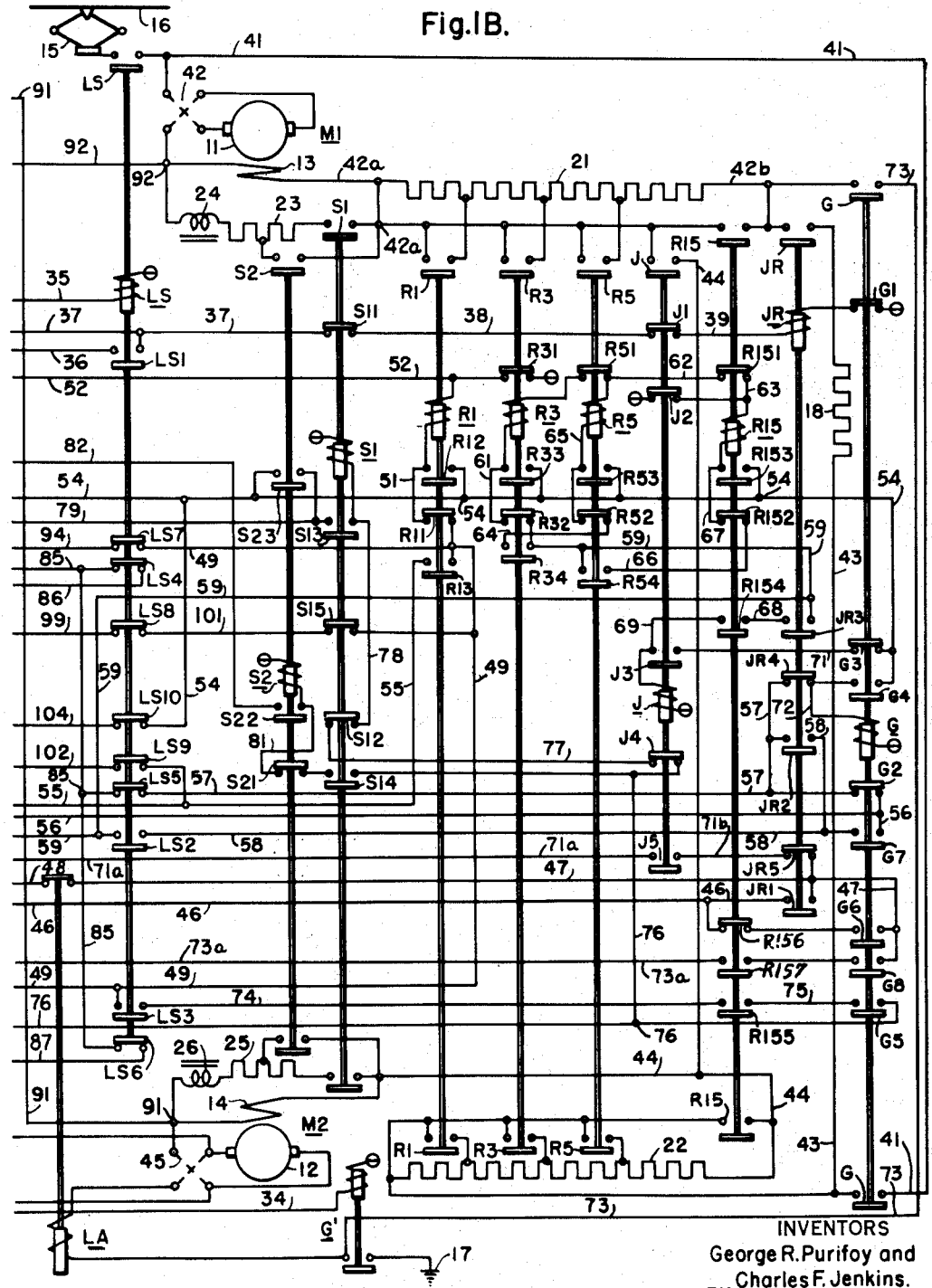

Referring to the drawings, two motors M1 and M2 may be utilized for propelling an electric vehicle (not shown). The motors are of the series type having armature windings 11 and 12 and series field windings 13 and 14, respectively. A line switch LS is provided for connecting the motors to a current collecting device 15 which engages a trolley conductor 16. A switch G' may also be provided for connecting the motors to a ground connection 17, thereby completing the circuit to a source of power, such as a power generating station (not shown).

As indicated in the sequence chart in Figure 4, the motors M1 and M2 are first connected in series-circuit relation and then in parallel-circuit relation during acceleration of the vehicle. In addition to the switch LS a switch JR is provided for connecting the motors in series-circuit relation. Bridging transition of the motors is obtained by means of a switch J which is closed during the transition period. The parallel-circuit connections are established through the switch LS and a double-pole switch G.

The motors may also be connected for dynamic braking with the field winding 14 connected across the armature winding 11 and the field winding 13 connected across the armature winding 12, thereby permitting the current in the armature windings to reverse and cause the motors to act as generators and retard the vehicle. In addition to the switch G which is closed during dynamic braking, switches B1, B2, B3, B8, B9 and B10 are utilized to establish the dynamic braking circuits and to control the motor current by shunting a resistor 19 from the motor circuits during dynamic braking.

The motor current is controlled during acceleration by resistors 18, 21 and 22, and during dynamic braking by resistors 19, 21 and 22. Double-pole resistor shunting switches R1, R3, R5 and R15 are provided for shunting the resistors 21 and 22 step-by-step. The resistor shunting switches operate in sequential relation, the sequence being controlled by interlock progression in a manner well known in the art.

During acceleration, the operation of the resistor shunting switches is automatically controlled by a current responsive relay LA having an actuating coil which is connected in the motor circuit. During dynamic braking the operation of the resistor shunting switches is normally controlled by a current responsive relay LB having an actuating coil connected in the dynamic braking circuit.

In order to prevent the motor voltage from exceeding the commutating limit of the motors when dynamic braking is established while the vehicle is operating at high speeds, an over voltage relay OV is connected across the armature winding 12 of the motor M2. The contact members of the relay OV are so connected in series-circuit relation with the contact members of the current responsive relay LB that the progression of the resistor shunting switches may be stopped by either the over voltage relay or the current responsive relay LB.

As shown by the notching curve illustrated in Figure 3, operation of the resistor shunting switches is under the control of the over voltage relay when the vehicle is operating above a predetermined speed, for example 50 miles per hour. When the vehicle is operating below 50 miles per hour the operation of the resistor shunting switches is controlled by the current limit relay. In this manner the voltage of the motors is prevented from exceeding the commutation limits of the motors.

An accelerating controller AC is provided for controlling the operation of the motor connecting switches during acceleration of the vehicle. The controller AC may be of the drum type. A braking controller BC is provided for starting the progression of the resistor shunting switches during dynamic braking. The progression of the resistor shunting switches may be stopped and held at any time during dynamic braking by returning the braking controller BC to position 1 which is known as the "hold" position. When the controller BC is on position 2 the progression of the resistor shunting switches is controlled by the relay OV and LB as previously explained.

Provision is made for shunting the series field windings of the motors during portions of the accelerating and braking cycles by means of field shunting switches S1 and S2. The shunt circuit for the field winding 13 comprises a resistor 23 and a reactor 24. The shunt circuit for the field winding 14 comprises a resistor 25 and a reactor 26.

When the accelerating controller AC is returned to the "off" position the dynamic braking circuits for the motors are established. However, the current which flows through the motors during coasting of the vehicle is maintained at a relatively low value since the motor fields are shunted by the field shunting switches and a relatively high amount of resistance is kept in the motor armature circuits. In addition to the resistors 19, 21 and 22 a coasting resistor 27 is connected in the dynamic braking circuits by means of a coasting switch S during coasting of the vehicle.

A spotting relay SR is provided for controlling the operation of the resistor shunting switches during coasting of the vehicle. The actuating coil of the relay SR is connected across a portion of the resistor 19 which is in the dynamic braking circuit. Thus, the relay SR is responsive to the vehicle's speed since the voltage drop across the resistor 19 varies with the current through the resistor, which, in turn, is proportional to the vehicle speed. In this manner the resistor shunting switches are operated in accordance with the vehicle speed and the equipment is prepared to respond promptly whenever a brake application is made.

In order that the functioning of the foregoing apparatus may be more clearly understood the operation of the system will now be described in more detail. Assuming that it is desired to accelerate the vehicle automatically under the control of the limit relay LA, the accelerating controller AC is actuated to position 4.

When the controller AC is on position 1 the switches LS, G' and JR are closed to connect the motors M1 and M2 in series-circuit relation and in series with the resistors 18, 21 and 22. The energizing circuit for the line switch LS may be traced from positive through a segment 31 on the controller BC, conductor 32, a segment 33 on the controller AC, conductor 34, an interlock B21, conductor 35 and the actuating coil of the switch LS to negative. The energizing circuit for the switch G' extends from the conductor 34 through the coil of the switch to negative. The energizing circuit for the switch JR extends from the accelerating-controller segment 33 through a conductor 36, an interlock LS1, conductor 37, an interlock S11, conductor 38, an interlock J1, conductor 39, the actuating coil of the switch JR and an interlock G1 to negative.

The closing of the switches LS, G' and JR connects the motors in series-circuit relation through a circuit which extends from the current collecting device 15 through the switch LS, conductor 41, a reversing switch 42, the armature winding of the motor M1, the reversing switch 42, a conductor 92, the series field winding 13, a conductor 42a, the resistor 21, a conductor 42b, the switch JR, the resistor 18, conductor 43, the resistor 22, conductor 44, the series field winding 14, a conductor 91, a reversing switch 45, the armature winding 12, the reversing switch 45, the actuating coil of the limit relay LA and the switch G' to ground at 17.

Following the closing of the switch JR, if the accelerating controller AC is moved to its position 2, the resistor shunting switches R1, R3, R5 and R15 are closed in sequential relation under the control of the limit relay LA. The energizing circuit for the actuating coil of the switch R1 may be traced from the segment 33, on positions 2, 3 and 4 of the controller AC, through conductor 46, an interlock JR1, conductor 47, the contact members of the relay LA, conductor 48, an interlock B11, conductor 49, an interlock R11, conductor 51, the actuating coil of the switch R1, conductor 52 and an interlock R31 to negative or through an interlock B22 to negative. A holding circuit for the switch R1 is established from the conroller-conductor 36, the LS-in interlock LS1, and the conductor 37, thence through an interlock B12, conductor 54 and an interlock R12 to the actuating coil of the switch R1.

As explained hereinbefore, the switches R3, R5 and R15 are closed by interlock progression from the conductor 49, under the control of the limit-relay contacts LA, which are energized from the conductor 47. The energizing circuit for the actuating coil of the switch R3 extends from the conductor 49 through an interlock R13, conductor 55, an interlock B13, conductor 56, an interlock G2, conductor 57, an interlock JR2, conductor 58, an interlock LS2, conductor 59, an interlock R32, conductor 61, the actuating coil of the switch R3, an interlock R51, conductor 62, an interlock R151, conductor 63, and an interlock J2 to negative. A holding circuit for the switch R3 is established from the conductor 54 through an interlock R33 to the coil R3, and thence through the interlocks R51, R151 and J2 to negative.

Following the closing of the switch R3 the actuating coil of the switch R5 is energized through a circuit which extends from the conductor 59 through an interlock R34, conductor 64, an interlock R52, conductor 65, the actuating coil of the switch R5, conductor 62 and thence to negative through a circuit previously traced. A holding circuit for the switch R5 is established from the conductor 54 through an interlock R53 to the coil R5, and thence through the interlocks R151 and J2 to negative.

The actuating coil of the switch R15 is energized following the closing of the switch R5 through a circuit which extends from the conductor 59 through an interlock R54, conductor 66, an interlock R152, conductor 67, the actuating coil of the switch R15, conductor 63 and the interlock J2 to negative. A holding circuit for the switch R15 is established through an interlock R153 to the coil R15, and thence through the interlock J2 to negative. It will be noted that the closing of the switch R5 opens the interlock R51, thereby causing the switch R3 to open. Likewise, the closing of the switch R15 opens the interlock R151, thereby causing the switch R5 to open, as shown in the sequence chart in Figure 4.

Following the closing of the switch R15 the transition-switch J is closed, thereby short-circuiting the resistor 18, which is the last of the accelerating-resistances in the series-circuit connection of the motors M1 and M2. The energizing circuit for the coil of the transition-switch J extends from the conductor 59 through an interlock JR3, conductor 68, an interlock R154, conductor 69 and the actuating coil of the switch J to negative. A holding circuit for the switch J extends from the conductor 54 through an interlock G3, conductor 71, an interlock J3, and the coil of the switch J to negative. The closing of the transition-switch J closes its main switch-contact J between the respective motor-terminals 42a and 44, thereby short-circuiting the accelerating-resistor 18 and the main switch-contacts R15 and JR. The closing of the transition-switch J also opens its interlocks J1 and J2, thus deenergizing the switches JR and R15.

The deenergization of the initial series-connection switch JR opens its interlocks JR1 and JR3, thereby interrupting the previously described energizing-circuits for the conductors 47 and 68. It will be recalled that the conductor 47, in cooperation with the limit-switch LA and the interlock R13 of the first resistance-switch R1 (which is now closed through its holding-circuit), controls the sequential reclosure of the accelerating-switches R3, R5 and R15, while the deenergization of the conductor 68 at the (now-open) JR-interlock JR3 prevents any reenergization of the transition-switch J after its holding-circuit 71 is deenergized at the G-switch interlock G3, as will now be described.

If, now, the accelerating controller AC is in either of its positions 3 or 4, the next step in the acceleration of the motors M1 and M2 will be for the parallel-operation switch G to be closed, to complete the parallel connections for the motors M1 and M2. The energizing circuit for the coil of the parallel-connection switch G extends from the accelerating-controller segment 33, a conductor 71a, a J-in interlock J5, a conductor 71b, a JR-out interlock JR5, and the conductor 57, thence through a JR-out interlock JR4, conductor 72 and the actuating coil of the switch G to negative. A holding circuit for the switch G is established from the conductor 54 through an interlock G4 upon the closing of the switch G. The closing of the parallel-operation switch G closes its two main switch-contacts G, thereby connecting the terminal 42b of the accelerating-resistor 21 of one motor M1 to a conductor 73 which is grounded through the switch G' at 17, and connecting the terminal 43 of the accelerating-resistor 22 of the other motor M2, through the second main switch contact G, to the trolley-energized conductor 41. As soon as this parallel-operation switch G is actuated, it opens its interlock G3 and thus interrupts the holding-circuit 71–J3 of the transition-switch J, thereby opening the main switch-contact J between the M1-terminal 42a and the M2-terminal 44.

The motors M1 and M2 are now connected in parallel-circuit relation. The circuit through the motor M1 extends from the trolley-energized conductor 41 through the reversing switch 42, the armature winding 11, the reversing switch 42, the conductor 92, the series field winding 13, the motor-terminal 42a, the accelerating-resistor 21 which is partially short-circuited by the switch R1, the resistor-terminal 42b, one set of main contact members of the switch G, conductor 73 and the switch G' to ground at 17. The circuit through the other motor M2 extends from the trolley-energized conductor 41 through the other main contact members of the switch G, the resistor-terminal 43, the accelerating-resistor 22 which is partially short-circuited by the switch R1, the motor-terminal 44, the series field winding 14, the conductor 91, the reversing switch 45, the armature winding 12, the reversing switch 45, the coil of the limit relay LA and the switch G' to ground at 17.

The actuation of the parallel-connection switch G reenergizes the sequential-acceleration conductor 47 from the accelerating-controller conductor 46, through an R15-out interlock R156 and a G-in interlock G6, and at the same time another G-in interlock G7 bypasses the G-out interlock G2 and the JR-in interlock JR2 between the conductors 56 and 58, thereby causing the acceleration of the motor to be continued by the closing of the switches R3, R5 and R15 to progressively shunt the resistors 21 and 22 from the motor circuit. The resistor shunting switches are operated in sequential relation under the control of the limit relay LA in the manner previously described.

Upon the closing of the last resistance-removing switch R15 during the parallel-motor operation, if the acceleration-controller AC is in its position number 3, the automatic acceleration under the control of the limit-switch LA is arrested by the opening of the R15-out interlock R156 between the acceleration-controller conductor 46 and the progression-controlling conductor 47. If, however, the acceleration-controller AC is in position 4, then upon the closing of the switch R15 the actuating coil of the field shunting switch S1 will be energized to establish the field shunting circuits for the series field windings 13 and 14. The energizing circuit for the switch S1 extends from the acceleration-controller segment 33, a conductor 73a, an R15-in interlock R157, a G-in interlock G8, the conductor 47, the contact of the limit-relay LA, the conductor 48, the B-out interlock B11, and the conductor 49, thence through an interlock LS3, conductor 74, an interlock R155, conductor 75, an interlock G5, conductor 76, an interlock J4, conductor 77, an interlock S12, conductor 78 and the actuating coil of the switch S1 to negative. A holding circuit for the switch S1 extends from the conductor 54 through an interlock B23, conductor 79, an interlock S13 and the coil of the switch S1 to negative.

Following the closing of the switch S1, the field shunting switch S2 is closed to shunt portions of the resistors 23 and 25 from the field shunting circuits. The energizing circuit for the switch S2 extends from the conductor 76 through interlocks S14 and S21, conductor 81 and the actuating coil of the switch S2 to negative. A holding circuit for the switch S2 extends from the conductor 54 through an interlock B24, conductor 82, an interlock S22 and the coil of the switch S2 to negative. When the field shunting switch S2 is closed the accelerating cycle is completed.

If it is desired to permit the vehicle to coast, the accelerating controller AC is actuated to the "off" position, thereby causing the opening of the switches LS and G' to disconnect the motors from the power source. Following the opening of the switch LS the switch B1 is closed to establish dynamic braking circuits for the motors. The energizing circuit for the switch B1 may be traced from positive through the segment 31 on the braking controller BC, conductor 83, a segment 84 on the accelerating controller AC, conductor 85, an interlock LS4, conductor 86 and the actuating coil of the switch B1 to negative. At this time the coasting switch S is closed to connect the coasting resistor 27 in the dynamic braking circuit. The energizing circuit for the coasting switch S extends from the controller-conductor 85 through an interlock B25 and the coil of the switch S2 to negative.

At this time the switch G is held closed through an interlock LS5 which establishes a circuit from the controller-conductor 85 to the conductor 57, and thence through the JR-out interlock JR4 and the conductor 72 to the G-switch coil G. The closure of the G-switch also closes the interlock G4 which establishes an energizing-circuit for the relay-holding conductor 54, this energizing-circuit being traceable from the controller-conductor 85 through LS5, 57, JR4, 72, and G4 to 54. The field shunting switches S1 and S2 are also closed through a circuit which extends from the controller-conductor 85 through an interlock LS6, conductor 87 and an interlock S3 to the conductor 76, and thence initially through the J-out interlock J4, the conductor 77 and the S1-out interlock S12, and finally through the holding-interlocks S13 and S22 which are energized through 79–B23 and 82–B24 from the previously described relay-holding conductor 54. The field shunting switch S1 is also held in by the S2-in interlock S23 as long as the S2 switch is closed.

At this time the motors are connected for a negligible amount of dynamic braking, with all of the resistors 19, 21, 22 and 27 connected in the dynamic braking circuits and with the field shunting switches S1 and S2 closed to maintain a weak field on the motors. Since the motors are operating with a weak field strength, and since the maximum amount of external resistance is connected in the dynamic braking circuits, a negligibly small amount of braking current circulates through the motors, so that, to all practical intents and purposes, the motors are coasting.

The dynamic braking circuit for the motor M1 may be traced from one terminal of the armature winding 11 through the reversing switch 42, the (now deenergized) trolley-line conductor 41, the switch G, conductor 43, the resistor 22, the motor-terminal 44, the field winding 14 of the motor M2, conductor 91, one of the coasting-switch contacts S, the resistor 27, the other coasting-switch contact S, the resistor-terminal 91a, the resistor 19, the resistor-terminal 91b, the coil of the limit relay LB, the switch B1, conductor 92 and the reversing switch 42 to the other terminal of the armature winding 11. The braking circuit for the motor M2 may be traced from one terminal of the armature winding 12 through the reversing switch 45, the conductor 91, one of the coasting-switch contacts S, the resistor 27, the other coasting-switch contact S, the resistor-terminal 91a, the resistor 19, the resistor-terminal 91b, the limit relay LB, the switch B1, conductor 92, the field winding 13, the motor-terminal 42a, the resistor 21, the resistor-terminal 42b, the switch G, conductor 73, the coil of the limit relay LA and the reversing switch 45 to the other terminal of the armature winding 12.

During coasting of the vehicle the hereinafter described sequential operation of the resistor shunting switches R1, B3, B8, B9, B10, R3, R5 and R15 is under the control of the spotting relay SR, the actuating coil of which is connected across a portion of the braking resistor 19. As explained hereinbefore the spotting relay SR is responsive to the motor speed. In this manner the resistor shunting switches are progressively notched, at a low or negligible braking-current, in accordance with the car speed, and the system is thus prepared to respond promptly, with an approximately adequate amount of braking-resistance already in circuit, whenever a brake application is called for, without waiting to make these preliminary approximate braking-circuit resistance-adjustments until after a braking application is called for. At motor-speeds below a safe commutating-limit for the motors, say at speeds corresponding to vehicle-speeds less than 50 miles per hour, the contact members of the spotting relay SR establish a circuit from the controller-conductor 85 through an interlock B26, conductor 93, the contact members of the spotting relay SR, conductor 94, and an interlock LS7 to the conductor 49, which initiates the sequential operation of the resistor-shunting switches R1, B3, B8, B9, B10, R3, R5 and R15. During this preliminary brake-presetting operation, however, the progress of the sequential switch-operation is halted, not by the motor-operation limit-switch LA, nor yet by the braking-operation limit-switch LB, but by the speed-responsive, presetting, spotting-relay SR, so that as much, or all, of the braking-circuit resistors 19, 21 and 22 will be cut out, during the coasting period, as will be necessary to provide a high-speed brake-application promptly upon an initiation of the braking operation, in a manner subsequently to be described. As the braking-circuit resistances 19, 21 and 22 are progressively cut out, by this presetting operation during coasting, the small braking-current which is then flowing through the braking resistor 19 is progressively increased, thus changing the speed-setting of the spotting relay SR and increasing its excitation, until finally this spotting relay SR picks up and halts this preliminary or brake-presetting progression of the resistance-controlling switches R1, B3, B8, B9, B10, R3, R5 and R15.

If it is desired to decelerate the vehicle by the application of a sensible amount of dynamic braking, the braking controller BC is actuated at least to position 1, thereby closing the switch B2, and usually the braking controller is moved all the way to position 2. The energizing circuit for the actuating coil of the switch B2 may be traced from the segment 31 on the braking controller BC through conductor 95, an interlock B14, conductor 96 and the actuating coil of the switch B2 to negative. The closing of the switch B2 closes its main contact B2, which short-circuits the coasting-resistance 27 and the two main coasting-switch contacts S, thus increasing the braking-current to an amount which produces a sensible braking-action. The closing of the brake-applying switch B2 also opens its interlock B25, which causes the opening of the coasting switch S.

The closing of the brake-applying switch B2 also opens its interlock B24, which interrupts the holding circuit 82-S22 of the field shunting switch S2, which opens, thus reducing the field-shunting current, and increasing the field-current of the motors. The deenergization of the field-shunting switch S2 opens its interlock S23, which cooperates with the (now open) B2-out interlock B23 to open the holding circuit 79-S13 for the other field-shunting switch S1. In this manner full field strength is rapidly applied to the motors M1 and M2, thereby building up the dynamic braking current, as shown by the portions 1 to 3 of the curve in Fig. 3, corresponding to the dynamic-braking positions 1 to 3 of the sequence-chart in Fig. 4. The resistor 19 for dynamic braking is designed to make the peak current value for the full field step just under the commutating limit for maximum speed, when all of the respective accelerating resistors 21 and 22 are included in the dynamic-braking circuits of the respective motors M2 and M1.

At this time, due to the opening of the B2-out interlock B26, the control of the progression of the resistor shunting switches, R1, B3, B8, B9, B10, R3, R5 and R15 is taken away from the spotting relay SR. If, now, the braking-controller BC is moved to its No. 2 position, or is in that position already, the progression of the resistance-shunting switches will be turned over to the control of, or continued by, the braking-operation current limit relay LB and the over voltage relay OV, the contact members of which are connected in series-circuit relation. As explained hereinbefore, if the car speed is below 50 miles per hour, during braking, the progression of the resistor shunting switches R1, B3, B8, B9, B10, R3, R5 and R15 is under the control of the braking-circuit current limit relay OV LB since the over voltage relay will not operate at a speed below 50 miles per hour.

If the speed is above 50 miles per hour at the time when the dynamic braking is applied by moving the braking controller BC to its No. 2 position, the over voltage relay OV, which is connected across the armature 12 of the motor M2, picks up and stops the progression of the resistor shunting switches R1, B3, B8, B9, B10, R3, R5 and R15 by opening its contact members which are connected in series-circuit relation with the contact members of the braking-current limit-relay LB. The progression of the resistance-shunting switches is stopped by said over voltage relay OV until the car speed and the voltage of the motors decrease below the drop out point of the over voltage relay. As shown by the portions 4 to 8 of the curve in Figure 3, corresponding to the dynamic-braking positions 4-8 of the sequence-chart in Fig. 4, the braking current is held down sufficiently in this manner to prevent exceeding the commutating limits of the motors.

Assuming that the car is operating at a speed below 50 miles per hour when the braking controller BC is moved to its No. 2 position, the first-resistance-shunting switch R1 (if it has not already been closed during the coasting-period by the operation of the spotting relay SR) will be closed as soon as the field-shunting switch S1 has opened, thus starting the progression of the resistor shunting switches. The energizing circuit for the coil of the switch R1 may be traced from the segment 31 on the braking controller BC through conductor 97, the contact members of the overvoltage relay OV, conductor 98, the contact members of the braking-current limit-relay LB, conductor 99, an interlock LS8, conductor 101, an interlock S15, conductor 49, the interlock R11, conductor 51, the actuating coil of the switch R1, conductor 52 and the interlock R31 to negative. The switch R1 holds itself in, in the manner already described. This switch R1 cuts out a portion of each of the resistors 21 and 22 in the dynamic-braking circuits of the respective motors M2 and M1.

Following the closing of the switch R1, the switches B3, B8, B9 and B10 are closed by interlock progression to shunt the resistor 19 from the dynamic braking circuit. The energizing circuit for the switch B3 extends from the controller-conductor 97, through the previously traced energizing-circuit OV–98–LB–99–LS8–101–S'5–49, thence through the R1-in interlock R13 to the conductor 55, and thence through an interlock LS9, conductor 102, an interlock B31, the coil of the switch B3, an interlock B91, conductor 103 and an interlock B101 to negative. A holding circuit for the switch B3 is established from the relay-holding conductor 54 through an interlock LS10, conductor 104, an interlock B32, the coil of the switch B3 and thence to negative through the circuit previously traced.

The switches B8, B9 and B10 are closed by interlock progression in the order shown in the dynamic-braking positions 6, 7 and 8 in the sequence chart in Figure 4. It is believed to be unnecessary to describe the operation of these switches in detail since they operate in a manner similar to the switches R3, R5 and R15.

Following the closing of the switch B10, the switch R3 is closed. The energizing circuit for the switch R3 extends from the conductor 49 through an interlock B102 to the conductor 59 and thence through the actuating coil of the switch R3 through a circuit previously traced. Following the closing of the switch R3, the switches R5 and R15 are then closed by interlock progression in the manner previously described.

As explained hereinbefore, the progression of the resistor shunting switches may be stopped and held at any time during dynamic braking by returning the braking controller BC to position 1, thereby interrupting the circuit 97–OV–LB–99–LS8–101–S15 to the progression wire 49 but maintaining the circuit 85–LS5–57–JR4–72–G4 to the holding wire 54.

In addition to the interlocks described herein other protective interlocks have been shown on the diagram. These interlocks have not been described in detail since their function and method of operation are well known in the railway control art.

From the foregoing description it is apparent that we have provided a control system which permits dynamic braking to be established at all speeds of the vehicle but prevents an excessive voltage from being developed on the motors during dynamic braking, by holding up the progression of the resistor shunting switches until the motor voltage has dropped below a predetermined amount, under the control of the overvoltage relay OV. In this manner the motors are protected from excessive voltage and a low rate of braking is obtained until the voltage is reduced to a point which permits the braking-circuit current limit relay LB to take control of the progression of the resistor shunting switches.

Since numerous changes may be made in the above-described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system, in combination, a motor for propelling a vehicle, switching means for establishing dynamic braking connections for the motor, control means including a plurality of interlock-progression switches operable in sequential relation for controlling the dynamic braking current, a relay responsive to the dynamic braking current, a relay responsive to the motor voltage, means for interrupting said interlock-progression under the control of said voltage-responsive relay throughout the operation of said control means, and means for interrupting the interlock-progression under the control of said current-responsive relay whenever said voltage-responsive relay fails to respond throughout the operation of said control means.

2. In a control system, in combination, a motor for propelling a vehicle, switching means for establishing dynamic braking connections for the motor, control means including a plurality of interlock-progression switches operable progressively for controlling the dynamic braking current, a controller for starting the progression of the control means, a relay responsive to the dynamic braking current for stopping said progression in the event of a predeterminedly high dynamic braking current at all times throughout the dynamic-braking operation, and a relay responsive to the motor voltage for also stopping said progression, in the event of a predeterminedly high motor voltage, at all times whenever said current-responsive relay fails to respond throughout the dynamic-braking operation.

3. In a control system, in combination, a motor for propelling a vehicle, switching means for establishing dynamic braking connections for the motor, control means including a plurality of interlock-progression switches operable progressively for controlling the dynamic braking current, a controller for starting the interlock-progression of the control means, a relay responsive to the dynamic braking current, a relay responsive to the motor voltage, means for interrupting said interlock-progression under the control of said voltage-responsive relay throughout the dynamic-braking operation, and means for interrupting the interlock-progression under the control of said current-responsive relay whenever said voltage-responsive relay fails to respond throughout the dynamic-braking operation.

4. In a control system, in combination, a motor for propelling a vehicle, switching means for establishing dynamic braking connections for the motor, control means operable progressively for controlling the dynamic braking current, a controller for starting the progression of the control means, a relay responsive to the dynamic braking current for stopping said progression, and a relay responsive to the motor voltage for also stopping said progression, said relays having contact members connected in series-circuit relation in the control system.

5. In a control system, in combination, a motor for propelling a vehicle, switching means for establishing dynamic braking connections for the motor, control means for controlling the dynamic braking current, a relay responsive to the dynamic braking current, and a relay responsive to the motor voltage, said relays having contact members connected in series-circuit relation in the control system to control the operation of said control means.

6. In a control system, in combination, a motor for propelling a vehicle, switching means for establishing a dynamic braking circuit for the motor, resistance means connected in the dynamic braking circuit for controlling the motor current during dynamic braking, a plurality of resistor-shunting switches operable in sequential relation to vary the resistance in the dynamic braking circuit, a relay responsive to the dynamic braking current, and a relay responsive to the motor voltage, said relays having contact members connected in series-circuit relation in the control system to control the operation of said resistor-shunting switches.

7. In a control system, in combination a motor for propelling a vehicle, switching means for establishing a dynamic braking circuit for the motor, resistance means connected in the dynamic braking circuit for controlling the motor current during dynamic braking, a plurality of interlock-progression resistor-shunting switches operable in sequential relation to vary the resistance in the dynamic braking circuit, a relay responsive to the dynamic braking current, a relay responsive to the motor voltage, means for interrupting said interlock-progression under the control of said voltage-responsive relay throughout the dynamic-braking operation, and means for interrupting the interlock-progression under the control of said current-responsive relay whenever said voltage-responsive relay fails to respond throughout the dynamic-braking operation.

8. In a control system, in combination, a motor for propelling a vehicle, switching means for establishing dynamic braking connections for the motor, control means including a plurality of progressively operating switches operable in sequential relation for controlling the dynamic braking current, a relay responsive to the dynamic braking current, a separate relay responsive to the motor voltage, means for interrupting said progressive switch-operation under the control of said voltage-responsive relay throughout the operation of said control means, and means for interrupting the progressive switch-operation under the control of said current-responsive relay whenever said voltage-responsive relay fails to respond throughout the operation of said control means.

9. In a control system, in combination, a motor for propelling a vehicle, switching means for establishing dynamic braking connections for the motor, control means including a plurality of switches operable progressively for controlling the dynamic braking current, a controller for starting the progression of the control means, a relay responsive to the dynamic braking current for stopping said progression in the event of a predeterminedly high dynamic braking current at all times throughout the dynamic-braking operation, and a separate relay responsive to the motor voltage for also stopping said progression, in the event of a predeterminedly high motor voltage, at all times whenever said current-responsive relay fails to respond throughout the dynamic-braking operation.

10. In a control system, in combination, a motor for propelling a vehicle, switching means for establishing dynamic braking connections for the motor, control means including a plurality of switches operable progressively for controlling the dynamic braking current, a controller for starting the progression of the control means, a relay responsive to the dynamic braking current, a separate relay responsive to the motor voltage, means for interrupting said switch-progression under the control of said voltage-responsive relay throughout the dynamic-braking operation, and means for interrupting the switch-progression under the control of said current-responsive relay whenever said voltage-responsive relay fails to respond throughout the dynamic-braking operation.

11. In a control system, in combination, a motor for propelling a vehicle, switching means for establishing a dynamic braking circuit for the motor, resistance means connected in the dynamic braking circuit for controlling the motor current during dynamic braking, a plurality of progressively operating resistor-shunting switches operable in sequential relation to vary the resistance in the dynamic braking circuit, a relay responsive to the dynamic braking current, a separate relay responsive to the motor voltage, means for interrupting said switch-progression under the control of said voltage-responsive relay throughout the dynamic-braking operation, and means for interrupting the switch-progression under the control of said current-responsive relay whenever said voltage-responsive relay fails to respond throughout the dynamic-braking operation.

12. In a control system in combination, a motor for propelling a vehicle, switching means for establishing dynamic braking connections for the motor, control means including a plurality of interlock-progression switches operable in sequential relation for controlling the dynamic breaking current, current-responsive means, responsive to a predeterminedly high dynamic braking current, for interposing an impediment against said interlock-progression during the dynamic-breaking operation, and a voltage-responsive means, responsive to a predeterminedly high motor voltage, for interposing an impediment against said interlock-progression, regardless of the value of the dynamic braking current, during the dynamic-braking operation.

13. In a control system in combination, a motor for propelling a vehicle, switching means for establishing dynamic braking connections for the motor, control means including a plurality of progressively operating switches operable in sequential relation for controlling the dynamic braking current, current-responsive means, responsive to a predeterminedly high dynamic braking current, for interposing an impediment against said progressive switch-operation during the dynamic-braking operation, and a voltage-responsive means, responsive to a predeterminedly high motor voltage, for interposing an impediment against said progressive switch-operation, regardless of the value of the dynamic braking current, during the dynamic-braking operation.

GEORGE R. PURIFOY.
CHARLES F. JENKINS.

References Cited in the file of this patent

UNITED STATES PATENTS

| Number | Name | Date |
|---|---|---|
| 2,046,970 | Royer | July 7, 1936 |
| 2,477,666 | Purifoy | Aug. 24, 1948 |
| 2,479,397 | Newhouse | Aug. 16, 1949 |